(12) United States Patent
Bart et al.

(10) Patent No.: US 7,097,415 B2
(45) Date of Patent: Aug. 29, 2006

(54) LOW-PRESSURE TURBINE OF A TURBOMACHINE

(75) Inventors: Jacques Bart, Verrieres le Buisson (FR); Bruno Beutin, Evry (FR); Philippe Bouiller, Samoreau (FR)

(73) Assignee: Snecma Moteurs, Paris (FR)

( * ) Notice: Subject to any disclaimer, the term of this patent is extended or adjusted under 35 U.S.C. 154(b) by 121 days.

(21) Appl. No.: 10/910,635

(22) Filed: Aug. 4, 2004

(65) Prior Publication Data

US 2005/0089399 A1    Apr. 28, 2005

(30) Foreign Application Priority Data

Aug. 5, 2003    (FR) .................................. 03 09642

(51) Int. Cl.
*F01D 25/16* (2006.01)
(52) U.S. Cl. ........................................ 415/69; 415/229
(58) Field of Classification Search .................. 415/65, 415/66, 68, 69, 229; 416/126
See application file for complete search history.

(56) References Cited

U.S. PATENT DOCUMENTS

| | | | |
|---|---|---|---|
| 3,844,110 A | 10/1974 | Widlansky et al. | |
| 4,500,143 A * | 2/1985 | Kervistin et al. | 384/467 |
| 5,074,109 A | 12/1991 | Mandet et al. | |
| 5,443,590 A * | 8/1995 | Ciokajlo et al. | 416/128 |

FOREIGN PATENT DOCUMENTS

FR    2 633 023    12/1989

\* cited by examiner

*Primary Examiner*—Edward K. Look
*Assistant Examiner*—Devin Hanan
(74) *Attorney, Agent, or Firm*—Oblon, Spivak, McClelland, Maier & Neustadt, P.C.

(57) ABSTRACT

A low-pressure turbine of a turbomachine, the turbomachine comprising a high-pressure turbine disposed upstream from the low-pressure turbine, and an exhaust casing disposed downstream from the low-pressure turbine, the low-pressure turbine comprising a rotor secured on a low-pressure trunnion, a low-pressure shaft, a first rolling bearing disposed on said low-pressure shaft and supporting a high-pressure trunnion having fastened thereon a rotor of the high-pressure turbine, a second rolling bearing disposed on said low-pressure trunnion downstream from said first rolling bearing and enabling said low-pressure trunnion to be centered relative to said exhaust casing, and a system of fluting for enabling said low-pressure trunnion to drive said low-pressure shaft, said system of fluting being disposed between said first and second rolling bearings.

2 Claims, 2 Drawing Sheets

LOW-PRESSURE TURBINE OF A TURBOMACHINE

BACKGROUND OF THE INVENTION

The present invention relates to the general field of low-pressure turbines of aviation turbomachines. It relates more particularly to a particular way of assembling the rotor of the low-pressure turbine on the low-pressure shaft in order to facilitate assembly and disassembly.

An aviation turbomachine is typically provided with a high-pressure turbine placed at the outlet from a combustion chamber. A low-pressure turbine is disposed downstream from the high-pressure turbine in the flow direction of the gas coming from the combustion chamber. An exhaust case for the gas flow is assembled downstream from the low-pressure turbine. Thus, the gas coming from the combustion chamber passes through the high-pressure and low-pressure turbines in order to drive them in rotation, and is then exhausted via the exhaust casing.

The low-pressure turbine of the turbomachine essentially comprises a rotor (blades and disks) mounted on a low-pressure trunnion. The trunnion is assembled on a low-pressure shaft of the turbomachine via a fluting system that enables the low-pressure shaft to be driven in rotation. Similarly, the high-pressure turbine comprises a rotor (blades and disks) mounted on a high-pressure trunnion. A rolling bearing placed on the low-pressure trunnion enables the high-pressure trunnion to be supported to rotate relative to the low-pressure shaft.

FIG. 2 shows part of a prior art assembly of a low-pressure turbine rotor on the low-pressure shaft of a turbomachine. In this figure the rotor 100 of the low-pressure turbine 102 is fixed on a low-pressure trunnion 104. This low-pressure trunnion 104 extends axially firstly in an upstream direction to a rotor 106 of the high-pressure turbine 108, and secondly downstream to an exhaust casing 110 of the turbomachine. The rotor 106 of the high-pressure turbine 108 is secured to a high-pressure trunnion 112 extending axially towards the low-pressure trunnion 114.

The low-pressure turbine 102 drives a low-pressure shaft 114 in rotation via fluting 116 provided at the upstream end of the low-pressure trunnion 104. A first rolling bearing 118 is mounted at the downstream end of the low-pressure trunnion 114 in order to guarantee support and centering of the low-pressure-turbine 102 relative to the exhaust casing 110 of the turbomachine. A second rolling bearing 120 is also mounted on the low-pressure trunnion 104 in order to support the high-pressure trunnion 112 in rotation. The second bearing is disposed between the first bearing 116 and the fluting 116. In addition, a sealing gasket 122 is mounted on the low-pressure trunnion 104 between the second bearing 120 and the fluting 116. Associated with a plate 124, this gasket provides sealing between an air enclosure 126*a* and an oil enclosure 126*b*.

Such a low-pressure turbine assembly presents numerous drawbacks, in particular when disassembling the low-pressure turbine.

While a turbomachine is being disassembled (whether partially or completely), e.g. during maintenance, the various elements are typically removed through the rear of the turbomachine, i.e. in an upstream to downstream direction. Specifically, when the low-pressure turbine is to be disassembled, it is necessary in particular to begin by removing the exhaust casing. The high-pressure turbine (trunnion and rotor) is then subsequently withdrawn by being moved axially towards the downstream end of the turbomachine.

With the assembly shown in FIG. 2, once the exhaust casing 110 has been withdrawn, removing the low-pressure turbine 102 gives rise to problems. When the low-pressure turbine 104 is caused to slide axially downstream, the second bearing 120 and the sealing gasket 122 supported by the low-pressure trunnion disengage from the high-pressure trunnion 112.

Withdrawing the second rolling bearing 120 then leads to the low-pressure shaft 114 being off-center relative to the high-pressure trunnion 112 (and thus relative to the high-pressure turbine 108), such that the low-pressure shaft 114 is no longer held radially after the low-pressure turbine 102 has been removed. In addition, withdrawing the gasket 122 has the effect of breaking the seal between the air enclosure 126*a* and the oil enclosure 126*b*, such that oil spreads into the air enclosure, leading to a risk of an oil leak.

OBJECT AND SUMMARY OF THE INVENTION

The present invention thus seeks to mitigate such drawbacks by proposing a novel shape for a turbomachine high-pressure turbine that simplifies disassembly thereof by avoiding the high-pressure turbine becoming off-center relative to the low-pressure turbine shaft, and avoiding breaking the seal between the oil and air enclosures.

To this end, the invention provides a low-pressure turbine of a turbomachine, said turbomachine comprising a high-pressure turbine disposed upstream from the low pressure turbine in the flow direction of gas passing therethrough, and an exhaust casing disposed downstream from the low-pressure turbine in the flow direction of said gas, said low-pressure turbine comprising a rotor fastened on a low-pressure trunnion, and a rotary low-pressure shaft, said low-pressure turbine further comprising a first rolling bearing disposed on said low-pressure shaft and supporting a high-pressure trunnion on which there is fastened a rotor of the high-pressure turbine, a second rolling bearing disposed on said low-pressure trunnion downstream from said first rolling bearing and enabling said low-pressure trunnion to be centered relative to said exhaust casing, and a system of fluting enabling said low-pressure trunnion to drive said low-pressure shaft, said system of fluting being disposed between said first and second rolling bearings.

Since the first rolling bearing is placed on the low-pressure shaft, it is not disengaged from the high-pressure trunnion when the low-pressure trunnion is removed. As a result, during disassembly of the low-pressure turbine, the high-pressure trunnion continues to be supported by the first rolling bearing, thus enabling the low-pressure shaft to be remain centered relative to the high-pressure turbine. The low-pressure shaft thus continues to be held radially.

According to an advantageous characteristic of the invention, the low-pressure turbine further comprises a sealing gasket engaging the high-pressure trunnion, this sealing gasket being placed on the low-pressure turbine, upstream from the first rolling bearing.

Thus, since the sealing gasket is also disposed on the low-pressure shaft of the turbine, it is no longer disengaged from the high-pressure trunnion during disassembly of the low-pressure trunnion. As a result, during disassembly of the low-pressure turbine, the gasket is not withdrawn and the seal between the air and oil enclosures is therefore not broken.

BRIEF DESCRIPTION OF THE DRAWINGS

Other characteristics and advantages of the present invention appear from the following description given with reference to the accompanying drawings which show an embodiment that has no limiting character. In the figures.

DETAILED DESCRIPTION OF AN EMBODIMENT

Figure 1:
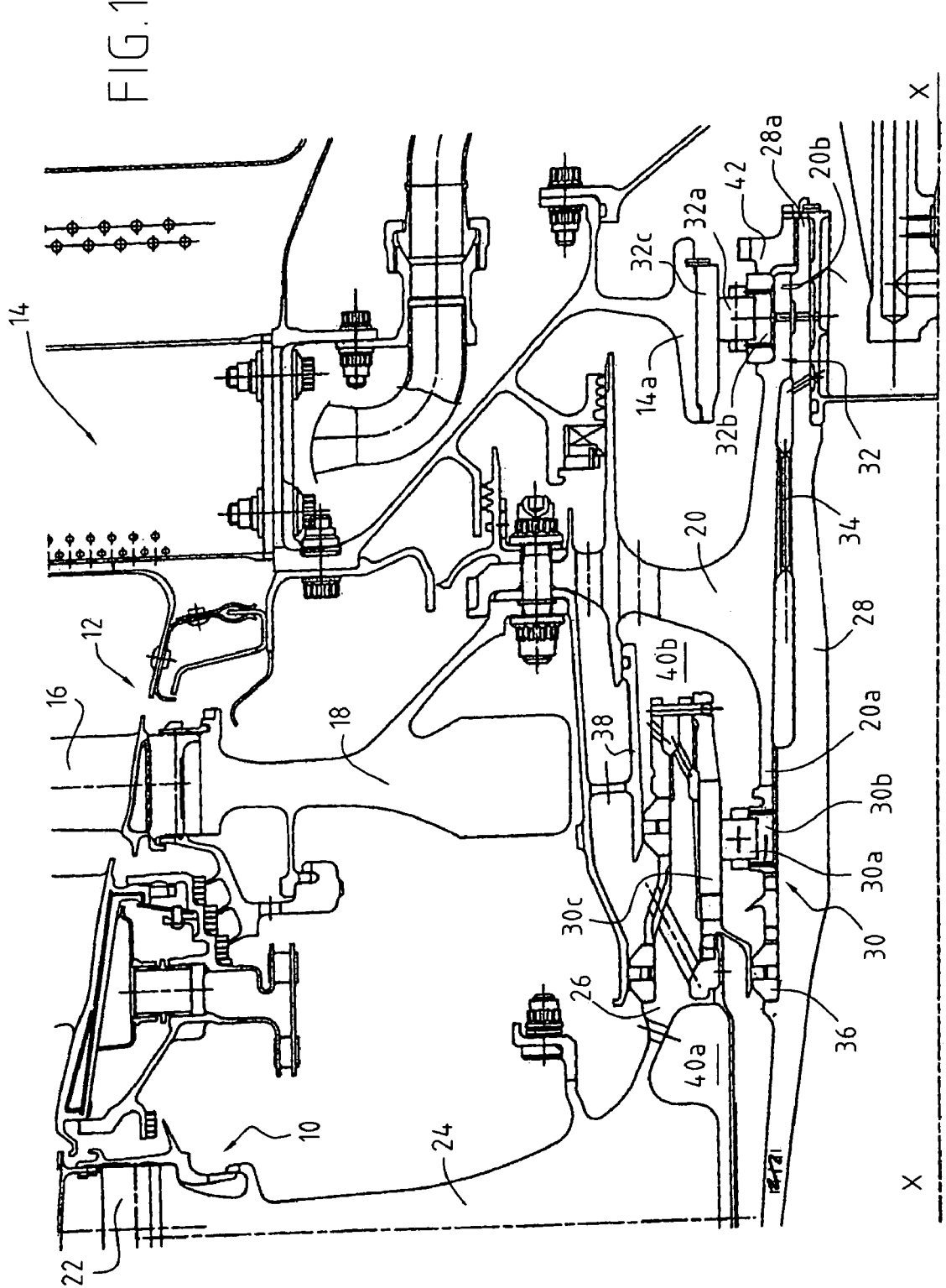
FIG. 1 is a fragmentary longitudinal section view of a low-pressure turbine of the invention.
Figure 2:
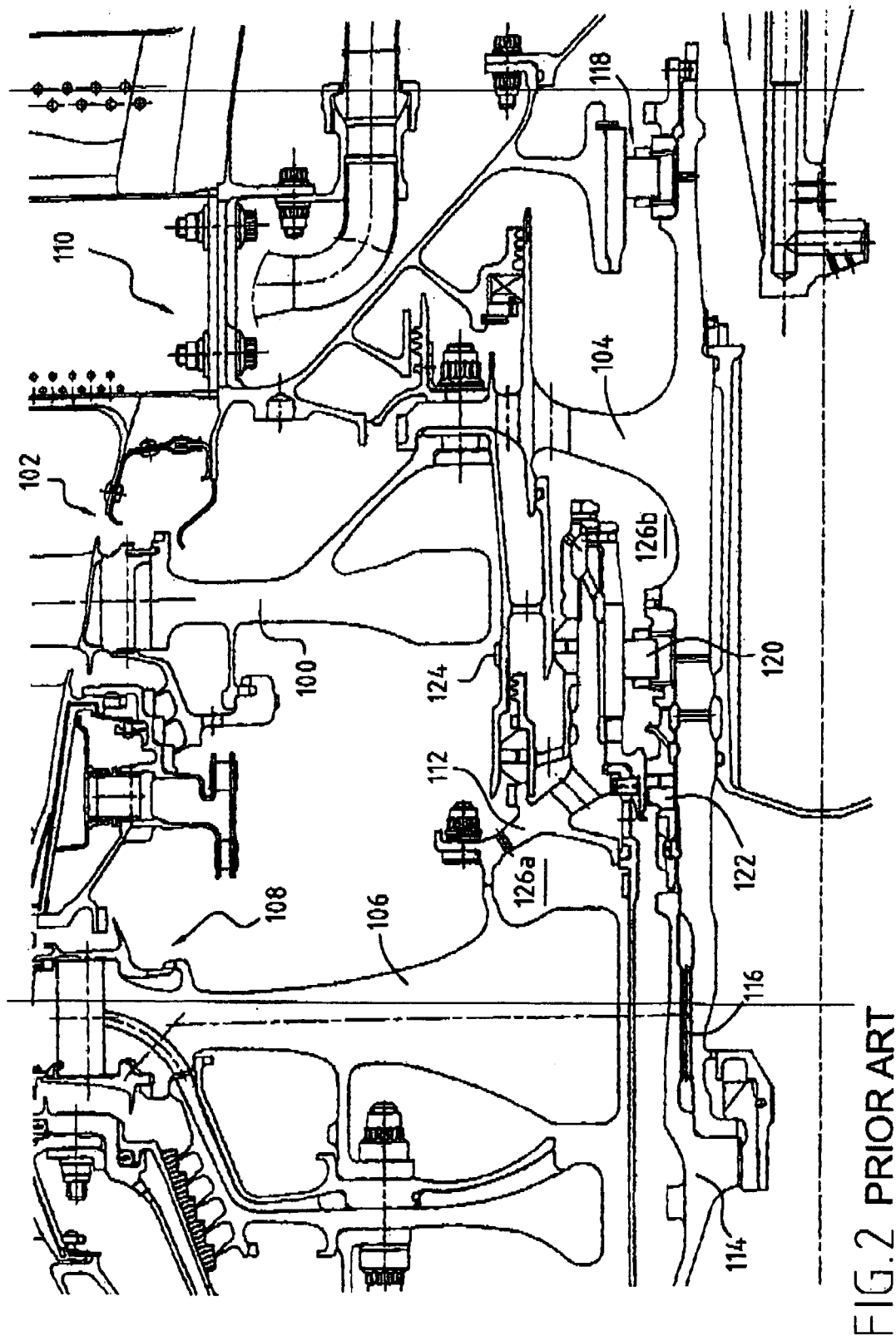
FIG. 2 is a fragmentary longitudinal section view of a prior art low-pressure turbine.

FIG. 1 shows a portion of a low-pressure turbine of the invention for a turbomachine. The turbomachine shown is fitted with a reheat system (of the after-burner type). Nevertheless, the present invention can equally well be applied to turbomachines without a reheat system.

In general, and in conventional manner, the turbomachine of longitudinal axis X—X comprises in particular a high-pressure turbine 10 disposed at the outlet from a combustion chamber (not shown). A low-pressure turbine 12 is disposed downstream from the high-pressure turbine 10 in the flow direction of the gas coming from the combustion chamber. The turbomachine also has an exhaust casing 14 arranged downstream from the low-pressure turbine 12.

The high-pressure turbine 12 essentially comprises a plurality of moving blades 16 mounted on a disk 18. The moving blades 16 and the disk 18 thus form the rotor of the low-pressure turbine. The disk 18 of the low-pressure turbine is in turn fastened to a low-pressure trunnion 20 for driving the turbine rotor in rotation.

In similar manner, the high-pressure turbine 10 comprises a plurality of moving blades 22 mounted on a disk 24. This disk is fastened to a high-pressure trunnion 26 which extends along the longitudinal axis X—X the turbomachine from a bottom end of the disk 24 of the high-pressure turbine to the disk 18 of the low-pressure turbine.

The rotor of the low-pressure turbine 12 drives a longitudinally-extending low-pressure shaft 28 in rotation, that has a downstream end 28a extending axially as far as the exhaust casing 14. The rotor of the high-pressure turbine 10 drives a high-pressure shaft (not shown in the Figure) in rotation, which shaft is concentric about the low-pressure shaft 28.

In the invention, a first inter-shaft rolling bearing 30 is mounted on the low-pressure shaft 28 to support the high-pressure trunnion 26 in rotation. More precisely, this first rolling bearing 30 is disposed on the low-pressure shaft against an upstream end 20a of the low-pressure trunnion 20.

Conventionally, the first bearing 30 is made up of a plurality of rollers 30a engaged between an inner ring 30b mounted on the low-pressure shaft 28 and an outer ring 30c secured to the high-pressure trunnion 26. Oil can be injected between the inner and outer rings in order to lubricate and cool the bearing.

A second rolling bearing 32 is also mounted on the downstream end 20b of the low-pressure trunnion 20. This second bearing 32 serves to ensure that the low-pressure trunnion 20 is supported and centered relative to the exhaust casing 14.

Like the first bearing 30, the second rolling bearing 32 comprises a plurality of rollers 32a engaged between the inner ring 32b mounted on the downstream end 20b of the low-pressure trunnion 20 and an outer ring 32c secured to a flange 14a that is secured to the exhaust casing 14. Lubricating and cooling oil can likewise be injected between the inner and outer rings of the bearing.

Furthermore, the low-pressure turbine 12 has a system of fluting 34 enabling the low-pressure shaft 28 to be driven by the low-pressure rotor. For example, this system is made up of complementary fluting formed on the low-pressure shaft 28 and on the low-pressure trunnion 20. The fluting extends axially between the first rolling bearing 30 and the second rolling bearing 32.

According to an advantageous characteristic of the invention, the low-pressure turbine 12 also includes a sealing gasket 36 engaging the high-pressure trunnion 26, this gasket being disposed on the low-pressure shaft 28 upstream from the first rolling bearing 30. The sealing gasket 36 may be made of carbon, for example.

In association with a plate 38 disposed longitudinally between the high- and low-pressure trunnions 26 and 20, this sealing gasket 36 serves to provide sealing between an upstream air enclosure 40a and a downstream oil enclosure 40b of the turbomachine.

The assembly comprising the sealing gasket 36, the first rolling bearing 30, the low-pressure trunnion 20, and the second rolling bearing 32 is prevented from moving longitudinally on the low-pressure shaft 28 by means of a nut 42 engaged tightly on the downstream end 28a of the low-pressure shaft.

There follows a description of the manner in which the above-described low-pressure turbine is disassembled during maintenance operations that are performed on the low-pressure rotor. This disassembly operation is performed by moving parts from the upstream end of the turbomachine towards its downstream end.

Initially, the exhaust casing 14 is removed, by being slid longitudinally in a downstream direction until it has been withdrawn from the turbomachine. Thereafter, the nut 42 that is tightened onto the downstream end 28a of the low-pressure shaft 28 is removed and the second rolling bearing 32 is disengaged from the low-pressure trunnion 20. Once these elements have been removed, the low-pressure turbine 12 can itself be removed. This operation is performed by moving it longitudinally in translation towards the downstream end of the low-pressure trunnion 20 to which the low-pressure rotor (moving blades and disk 18) is secured.

Since the first rolling bearing 30 is mounted on the low-pressure shaft 28 upstream from the low-pressure trunnion 20, it is not disengaged from the low-pressure shaft and the high-pressure trunnion 26. As a result, the high-pressure trunnion 26 continues to be supported by the first rolling bearing, and thus the high-pressure shaft 28 remains centered relative to the high-pressure turbine 10 while the low-pressure turbine is being disassembled. This simplified disassembly of the low-pressure turbine.

Similarly, since the sealing gasket 36 is mounted on the low-pressure shaft 28 upstream from the first rolling bearing 30 (and thus from the low-pressure trunnion 20), it is likewise not disengaged from the low-pressure shaft 28 and the high-pressure trunnion 26, and can thus continue to provide sealing. This avoids any oil coming from the oil enclosure 40b spreading into the air enclosure 40a during disassembly of the low-pressure turbine.

In addition to facilitating disassembly of the low-pressure turbine, the present invention makes it possible, for the same reasons, to simplify assembly of the low-pressure turbine (e.g. after maintenance operations have been performed on the rotor).

Since the low-pressure shaft 28 is already centered on the high-pressure turbine (i.e. is held radially), it is much simpler to engage the low-pressure turbine 12 without it being necessary to take action on elements of the high-pressure turbine. To perform this operation, the low-pressure turbine 12 is put into line with the high-pressure turbine 10 at a certain distance therefrom, and then the turbine is docked onto the low-pressure shaft 28 so that the fluting 34 of the turbine is properly engaged in the complementary fluting 34 of the low-pressure shaft. The low-pressure turbine 12 is then moved longitudinally in translation towards the high-pressure turbine 10 until the upstream end 20a of the low-pressure trunnion 20 comes into abutment against the inner ring 30b of the first rolling bearing 30. The rollers 32a of the second rolling bearing 32 are thus properly engaged in the outer ring 32c which is secured to the flange 14a of the exhaust casing 14, and the assembly is then locked in place by means of the nut 42.

The simplification provided by the invention in assembling and disassembling the low-pressure turbine leads in particular to reductions in the cost of maintaining the turbomachine.

Finally, compared with a prior art low-pressure turbine, the low-pressure turbine of the present invention presents the advantage of being lighter in weight, thereby making it possible to reduce the total weight of the turbomachine, and also to reduce production costs.

What is claimed is:

1. A low-pressure turbine of a turbomachine, said turbomachine comprising a high-pressure turbine disposed upstream from the low-pressure turbine in the flow direction of gas passing therethrough, and an exhaust casing disposed downstream from the low-pressure turbine in the flow direction of said gas, said low-pressure turbine comprising a rotor fastened on a low-pressure trunnion, and a rotary low-pressure shaft, said low-pressure turbine further comprising a first rolling bearing disposed on said low-pressure shaft and supporting a high-pressure trunnion on which there is fastened a rotor of the high-pressure turbine, a second rolling bearing disposed on said low-pressure trunnion downstream from said first rolling bearing and enabling said low-pressure trunnion to be centered relative to said exhaust casing, and a system of fluting enabling said low-pressure trunnion to drive said low-pressure shaft, said system of fluting being disposed between said first and second rolling bearings.

2. A turbine according to claim 1, wherein it further comprises a sealing gasket engaging the high-pressure trunnion, said sealing gasket being disposed on the low-pressure shaft, upstream from the first rolling bearing.

* * * * *